US012700327B2

(12) United States Patent
Cepuran et al.

(10) Patent No.: US 12,700,327 B2
(45) Date of Patent: Aug. 4, 2026

(54) SYSTEMS AND METHODS FOR ELECTRONIC PREDICTION OF RUBRIC ASSESSMENTS

(71) Applicant: D2L Corporation, Kitchener (CA)

(72) Inventors: Brian Cepuran, Kitchener (CA); Magdalena Jankowska, Kitchener (CA); Colin Conrad, Kitchener (CA); Jabez Harris, Kitchener (CA); Vlado Kešelj, Kitchener (CA)

( * ) Notice: Subject to any disclaimer, the term of this patent is extended or adjusted under 35 U.S.C. 154(b) by 0 days.

(21) Appl. No.: 18/784,567

(22) Filed: Jul. 25, 2024

(65) Prior Publication Data

US 2024/0379020 A1     Nov. 14, 2024

Related U.S. Application Data

(63) Continuation of application No. 16/399,221, filed on Apr. 30, 2019, now abandoned.

(60) Provisional application No. 62/664,558, filed on Apr. 30, 2018.

(51) Int. Cl.
*G09B 7/02* (2006.01)
*G06Q 10/0639* (2023.01)

(52) U.S. Cl.
CPC ......... *G09B 7/02* (2013.01); *G06Q 10/06393* (2013.01)

(58) Field of Classification Search
CPC ........ G06F 40/253; G06F 40/30; G06F 16/35; G06F 18/24; G09B 7/02; G06Q 10/06393; G06Q 50/205; G06Q 50/20
See application file for complete search history.

(56) References Cited

U.S. PATENT DOCUMENTS

| | | | |
|---|---|---|---|
| 6,115,683 A * | 9/2000 | Burstein | G06F 40/205 |
| | | | 707/E17.084 |
| 6,181,909 B1 | 1/2001 | Burstein et al. | |
| 6,366,759 B1 | 4/2002 | Burstein et al. | |
| 7,831,196 B2 | 11/2010 | Attali et al. | |
| 7,835,902 B2 | 11/2010 | Gamon et al. | |
| 8,170,868 B2 | 5/2012 | Gamon et al. | |
| 8,233,726 B1 * | 7/2012 | Popat | G06V 30/2445 |
| | | | 382/187 |
| 8,301,640 B2 | 10/2012 | Al Badrashiny et al. | |

(Continued)

FOREIGN PATENT DOCUMENTS

WO     WO-2005045786 A1 *     5/2005     ............... G09B 7/02

OTHER PUBLICATIONS

M. Ali Fauzi, Djoko Cahyo Utomo, Budi Darma Setiawan, and Eko Sakti Pramukantoro. 2017. Automatic Essay Scoring System Using N-Gram and Cosine Similarity for Gamification Based E-Learning. In Proceedings of the International Conference on Advances in Image Processing (ICAIP '17). (Year: 2017).*

(Continued)

*Primary Examiner* — Johnna R Loftis
(74) *Attorney, Agent, or Firm* — Amarok IP Inc.; Neil W. Henderson

(57)     ABSTRACT

Various embodiments are described herein that generally relate to a system and method for processing a plurality of grade objects to determine a value for an intermediate result grade object or a final result grade object according to an assessment structure. This may be accomplished by obtaining values for a plurality of grade objects and applying various policies and aggregator functions to these values based on the assessment structure.

10 Claims, 5 Drawing Sheets

(56) References Cited

U.S. PATENT DOCUMENTS

| | | | |
|---|---|---|---|
| 9,443,193 B2 | 9/2016 | Haberman et al. | |
| 9,514,417 B2 | 12/2016 | Kumar et al. | |
| 2002/0196679 A1 | 12/2002 | Lavi et al. | |
| 2004/0249628 A1 | 12/2004 | Chelba et al. | |
| 2009/0226872 A1 | 9/2009 | Gunther | |
| 2012/0131015 A1* | 5/2012 | Al Badrashiny | G06F 40/253 |
| | | | 707/E17.084 |
| 2015/0019452 A1 | 1/2015 | Ische | |
| 2015/0147728 A1 | 5/2015 | Hochenbaum et al. | |
| 2015/0199913 A1* | 7/2015 | Mayfield | G09B 7/02 |
| | | | 434/353 |
| 2015/0254229 A1* | 9/2015 | Beigman Klebanov | |
| | | | G06F 40/289 |
| | | | 434/353 |
| 2016/0133147 A1 | 5/2016 | Deane et al. | |
| 2016/0314354 A1 | 10/2016 | Teuton et al. | |
| 2017/0140659 A1* | 5/2017 | Alsanie | G06F 40/253 |
| 2017/0193291 A1 | 7/2017 | Lucchese | |
| 2018/0061254 A1 | 3/2018 | Amigud | |
| 2019/0180641 A1 | 6/2019 | Donaldson et al. | |

OTHER PUBLICATIONS

Odunayo Esther Oduntan, Ibrahim Adepoju Adeyanju, Stephen Olatunde Olabiyisi, Elijah Olusayo Omidiora . Evaluation of N-gram Text Representations for Automated Essay-Type Grading Systems. International Journal of Applied Information Systems. 9, 4 (Jul. 2015) (Year: 2015).*

M. Monjurul Islam and A. S. M. Latiful Hoque, "Automated essay scoring using Generalized Latent Semantic Analysis," 2010 13th International Conference on Computer and Information Technology (ICCIT), Dhaka, Bangladesh, 2010 (Year: 2010).*

Automatic Essay Scoring in E-learning System Using LSA Method with N-Gram Feature for Bahasa Indonesia Rico Setiadi Citawan, Viny Christanti Mawardi and Bagus Mulyawan MATEC Web Conf., 164 (2018) 01037 (Year: 2018).*

Jankowska, Magdalena, et al. "N-gram based approach for automatic prediction of essay rubric marks." Canadian Conference on Artificial Intelligence. Cham: Springer International Publishing, 2018. (Year: 2018).*

Jankowska M., Conrad C., Harris J., Keelj V. (2018) "N-Gram Based Approach for Automatic Prediction of Essay Rubric Marks", In: Bagheri E., Cheung J. (eds) Advances in Artificial Intelligence. Canadian A1 2018. Lecture Notes in Computer Science, vol. 10832. Springer, Cham. https:doi.org/10.1007/978-3-319-89654-4_30.

Fauzi M., Utomo D., Pramukantoro E., Setiawan B., B., "Automatic Essay Scoring System Using N-Gram and Cosine Similarity for Gamification Based E-Learning" (Year: 2017).

Lin C., Hovy E., "Automatic Evaluation of Summaries Using N-gram Co-Occurrences Statistics", Human Technology Conference 2003, (Year: 2003).

Burstein et al., The E-rater Automated Essay Scoring System.

Leah S. Larkey and W. Bruce Croft, "A Text Categorization Approach to Automated Essay Grading", 2003.

Putnins et al., "Advanced text authorship detection methods and their application to biblical texts".

* cited by examiner

SYSTEMS AND METHODS FOR ELECTRONIC PREDICTION OF RUBRIC ASSESSMENTS

CROSS-REFERENCE TO RELATED PATENT APPLICATIONS

The application is a continuation of U.S. patent application Ser. No. 16/399,221, filed on Apr. 30, 2019, which claims the benefit of U.S. Provisional Application No. 62/664,558, filed on Apr. 30, 2018. The complete disclosures of U.S. Provisional Application No. 62/664,558 and U.S. patent application Ser. No. 16/399,221 are hereby incorporated herein by reference for all purposes.

TECHNICAL FIELD

The embodiments described herein relate to electronic learning, and more particularly to systems and methods for providing assessment for electronic learning (e-Learning) systems.

INTRODUCTION

Electronic learning (also called e-Learning or eLearning) generally refers to education or learning where users (e.g. learners, instructors, administrative staff) engage in education related activities using computers and other computing devices. For example, learners may enroll or participate in a course or program of study offered by an educational institution (e.g. a college, university or grade school) through a web interface that is accessible over the Internet. Similarly, learners may receive assignments electronically, participate in group work and projects by collaborating online, and be graded based on assignments, tests, lab work, projects, examinations and the like that may be submitted using an electronic drop box or using other means as is known to those skilled in the art.

It should be understood that electronic learning is not limited to use by educational institutions, but may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g. studying an electronic textbook or watching a recorded or live webcast of a lecture) that is not associated with a particular institution or organization.

Electronic learning often occurs without any face-to-face interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are often fewer physical restrictions on learning. For example, the number of learners that can be enrolled in a particular course may be practically limitless, as there may be no requirement for physical facilities to house the learners during lectures.

Furthermore, learning materials (e.g. handouts, textbooks, etc.) may be provided in electronic formats so that they can be reproduced for a virtually unlimited number of learners.

Finally, lectures may be recorded and accessed at varying times (e.g. at different times that are convenient for different users), thus accommodating users with varying schedules, and allowing users to be enrolled in multiple courses that might have a scheduling conflict when offered using traditional techniques.

There can be a large variety as to how a course is programmed or designed using an eLearning system by an instructor and there can also be a large variety in terms of how an instructor determines the performance or the proficiency of the learners taking the course.

SUMMARY

In one aspect, in at least one example embodiment described herein, there is provided a method for processing a plurality of grade objects, the method being performed by a processor, wherein the method comprises obtaining a plurality of grade objects including a grade value associated with each grade object; applying zero or more contributor policies to the plurality of grade objects to generate a set of processed grade objects; applying an aggregator to the set of processed grade objects to generate an aggregate grade object; and applying zero or more result policies to the aggregate grade object to generate a result grade object.

The result grade object can be an intermediate result grade object or a final result grade object.

In at least some embodiments, the method further comprises storing the result grade object in a data store.

In at least some embodiments, the method further comprises at least one of displaying the result grade object on a display, generating a hardcopy output of the result grade object and sending the result grade object to an electronic device.

In at least some embodiments, the method further comprises relating the plurality of grade objects to one another according to an assessment structure before applying the zero or more contributor policies.

In at least some embodiments, the grade objects comprise zero or more atom grade objects and zero or more aggregate grade objects.

In at least some embodiments, the one or more contributor policies comprise at least one of applying a weight to each grade object, wherein a weight of 0 can be used to remove at least one of the grade objects; removing X grade objects having highest values and removing Y grade objects having lowest values, wherein X and Y are positive integers.

In at least some embodiments, the aggregator is configured to perform one of summing the set of processed grade objects, averaging the set of processed grade objects, obtaining a median of the set of processed grade objects, obtaining a mode of the set of processed grade objects, obtaining a minimum of the set of processed grade objects, obtaining a maximum of the set of processed grade objects, applying a Boolean logic expression to the set of processed grade objects and applying a numeric formula to the set of processed grade objects.

In at least some embodiments, the zero or more result policies comprise at least one of limiting the aggregate grade object to a value not more than 100% and converting the aggregate grade object to a discrete value that is closest in value to the aggregate grade object and is selected from a set of discrete values.

In another aspect, in at least one example embodiment described herein, there is provided a computing device for generating context specific terms, wherein the computing device comprises a data storage device comprising at least one collection of electronic files defining at least one contributor policy, at least one aggregation function, and at least one result policy; and at least one processor in data communication with the data storage device, the at least one processor being configured to process a plurality of grade objects by obtaining a plurality of grade objects including a grade value associated with each grade object; applying zero or more contributor policies to the plurality of grade objects to generate a set of processed grade objects; applying an aggregator to the set of processed grade objects to generate an aggregate grade object; and applying zero or more result policies to the aggregate grade object to generate a result grade object.

The at least one processor is further configured to perform one or more other acts of at least one of the methods as defined according to the teachings herein.

In another aspect, in at least one example embodiment described herein, there is provided a computer readable medium comprising a plurality of instructions executable on at least one processor of an electronic device for configuring the electronic device to implement a method for processing a plurality of grade objects, wherein the method comprises obtaining a plurality of grade objects including a grade value associated with each grade object; applying zero or more contributor policies to the plurality of grade objects to generate a set of processed grade objects; applying an aggregator to the set of processed grade objects to generate an aggregate grade object; and applying zero or more result policies to the aggregate grade object to generate a result grade object.

The computer readable medium further comprises instructions for performing one or more other acts of at least one of the methods as defined according to the teachings herein.

DRAWINGS

For a better understanding of the various embodiments described herein, and to show more clearly how these various embodiments may be carried into effect, reference will be made, by way of example, to the accompanying drawings which show at least one example embodiment, and in which:

FIG. 2b is a flow chart diagram illustrating an example embodiment of an assessment method for assessing an individual that can be used by the assessment engine of FIG. 2a;

DESCRIPTION OF VARIOUS EMBODIMENTS

Figure 1:
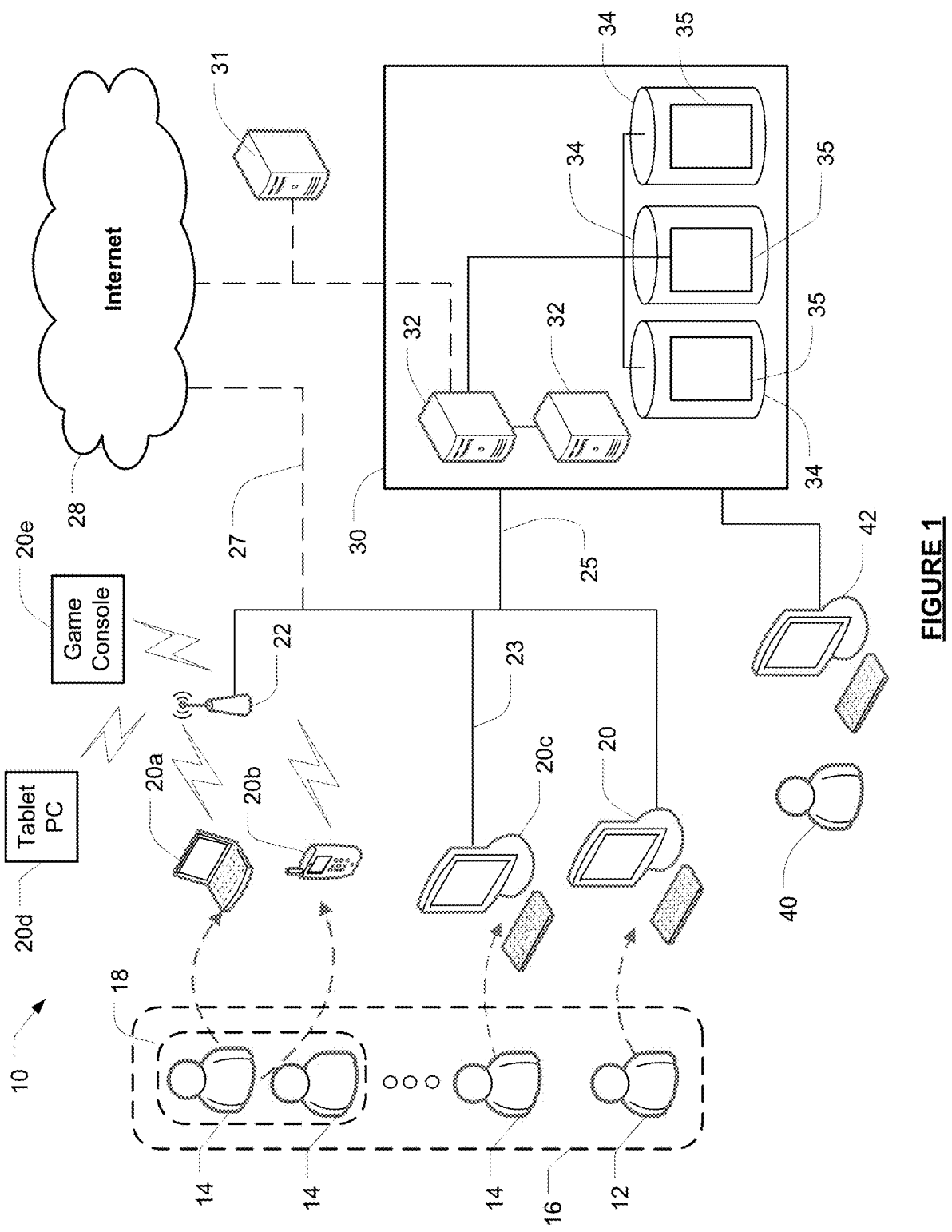
FIG. 1 is a block diagram illustrating an example embodiment of an educational system for providing electronic learning and testing.

Various apparatuses or processes will be described below to provide an example of an embodiment of the claimed subject matter. No embodiment described below limits any claimed subject matter and any claimed subject matter may cover processes or apparatuses that differ from those described below. The claimed subject matter is not limited to systems or methods having all of the features of any one system or method described below or to features common to multiple or all of the systems or methods described below. It is possible that a system or method described below is not an embodiment of any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein in any way, but rather as merely describing the implementation of various embodiments as described.

In some cases, the example embodiments of the systems and methods described herein may be implemented in hardware or software, or a combination of both. In some cases, example embodiments may be implemented in one or more computer programs executing on one or more programmable computing devices comprising at least one processor, a data storage device (including in some cases volatile and non-volatile memory and/or data storage elements), at least one input device (e.g. a keyboard, mouse or touch screen and the like), and at least one output device (e.g. a display screen, a printer, a wireless radio and the like).

For example, and without limitation, the programmable computing devices may include servers, personal computers, laptops, tablets, personal data assistants (PDA), cell phones, smart phones, gaming devices, and other mobile devices. Program code can be applied to input data to perform the functions described herein and to generate output information. The output information can then be supplied to one or more output devices for outputting to one or more users.

In some example embodiments described herein, each program may be implemented in a high level procedural or object oriented programming and/or scripting language to communicate with a computer system or a mobile electronic device. However, the programs can be implemented in assembly or machine language, as needed. In any case, the language may be a compiled or an interpreted language.

In some example embodiments described herein, the systems and methods may also be implemented as a non-transitory computer-readable storage medium configured with a computer program, wherein the storage medium so configured causes a computer to operate in a specific and predefined manner to perform at least some of the functions as described herein.

It should also be noted that the terms "coupled" or "coupling" as used herein can indicate that two elements or devices can be directly connected to one another or connected to one another through one or more intermediate elements or devices via an electrical element or electrical signal depending on the particular context.

The embodiments described herein generally relate to systems and methods that can be used to assess an individual in terms of their knowledge of a given subject matter, their performance or participation in a certain area, and/or their proficiency in a certain area. More particularly the systems and methods described herein allow an evaluator to more easily combine various items that are determined when testing the individual's knowledge of a given subject matter or their proficiency in a certain area in order to assess the individual.

Referring now to FIG. 1, shown therein an example embodiment of an educational system 10 for providing electronic learning. The system 10 as shown may be an electronic learning system or eLearning system. However, in other instances the educational system 10 may not be limited to electronic learning systems and it may be used with other types of systems.

Using the system, one or more users 12 and 14 can use the educational system 10 to communicate with an educational service provider 30 to participate in, create, and consume electronic learning services, including various educational courses. In some cases, the educational service provider 30 may be part of or associated with a traditional "bricks and mortar" educational institution (e.g. an elementary school, a high school, a university or a college), another entity that provides educational services (e.g. an online university, a company that specializes in offering training courses, or an organization that has a training department), or may be an independent service provider (e.g. for providing individual electronic learning).

It should be understood that a course is not limited to courses offered by formal educational institutions. The course may include any form of learning instruction offered by an entity of any type. For example, the course may be a training seminar at a company for a group of employees or a professional certification program (e.g. PMP, CMA, etc.) with a number of intended participants.

In some embodiments, one or more educational groups can be defined that includes one or more of the users 12 and 14. For example, as shown in FIG. 1, the users 12 and 14 may be grouped together in an educational group 16 representative of a particular course (e.g. History 101, French 254), with the user 12 or "instructor" being responsible for organizing and/or teaching the course (e.g. developing lectures, preparing assignments, creating educational content etc.), while the other users 14 are "learners" that consume the course content, e.g. the users 14 are enrolled in the course to learn the course content.

Furthermore, in some cases, the educational system 10 can be used to assess an individual's performance, knowledge or skills. For example, the educational system 10 may be used to test the user 12 on various subjects or to assess the proficiency of the user 14 in a given area.

In some cases, the users 12 and 14 may be associated with more than one educational group. For instance, the users 14 may be enrolled in more than one course and the user 12 may be enrolled in at least one course and may be responsible for teaching at least one other course or the user 12 may be responsible for teaching several courses, and so on.

In some cases, educational sub-groups may also be formed. For example, two of the users 14 are shown as part of an educational sub-group 18. The sub-group 18 may be formed in relation to a particular project or assignment (e.g.

sub-group 18 may be a lab group) or based on other criteria. In some cases, due to the nature of the electronic learning, the users 14 in a particular sub-group 18 need not physically meet, but may collaborate together using various tools provided by the educational service provider 30.

In some cases, the groups 16 and sub-groups 18 could include users 12 and 14 that share common interests (e.g. interests in a particular sport), that participate in common activities (e.g. users that are members of a choir or a club), and/or have similar attributes (e.g. users that are male or female, users under twenty-one years of age, etc.).

Communication between the users 12 and 14 and the educational service provider 30 can occur either directly or indirectly using any one or more suitable computing devices. For example, the user 12 may use a computing device 20 having one or more client processors such as a desktop computer that has at least one input device (e.g. a keyboard and a mouse) and at least one output device (e.g. a display screen and speakers).

The computing device 20 can generally be any suitable device for facilitating communication between the users 12 and 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, a terminal 20c over a wired connection 23 or a tablet computer 20d or a game console 20e over a wireless connection.

The computing devices 20 may be connected to the service provider 30 via any suitable communications channel. For example, the computing devices 20 may communicate to the educational service provider 30 over a local area network (LAN) or intranet, or using an external network, such as, for example, by using a browser on the computing device 20 to browse one or more web pages or other electronic files presented over the Internet 28 over a data connection 27.

The wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one of the users 14 may use a laptop 20a to browse to a webpage that displays elements of an electronic learning system (e.g. a course page).

In some cases, one or more of the users 12 and 14 may be required to authenticate their identities in order to communicate with the educational service provider 30. For example, at least one of the users 12 and 14 may be required to input a user identifier such as a login name and/or a password that is associated with that user or otherwise identify that user to gain access to the educational system 10.

In other cases, one or more users (e.g. "guest" users) may be able to access the educational system 10 without authentication. Such guest users may be provided with limited access, such as the ability to review one or more components of the course, for example, to decide whether they would like to participate in the course but they may not have some abilities, such as the ability to post comments or upload electronic files.

The educational service provider 30 generally includes a number of functional components for facilitating the provision of social electronic learning services. For example, the educational service provider 30 generally includes one or more processing devices 32 (e.g. servers), each having one or more processors. The processors on the servers 32 will be referred to generally as "remote processors" so as to distinguish them from client processors found in computing devices (20, 20*a*-20*e*). The processing devices 32 are configured to send information (e.g. electronic files such as web pages or other data) to be displayed on one or more computing devices 20, 20*a*, 20*b* and/or 20*c* in association with the electronic learning system 10 (e.g. course information). In some cases, the processing device 32 may be a computing device 20 (e.g. a laptop or a personal computer).

The educational service provider 30 also generally includes one or more data storage devices 34 (e.g. memory, etc.) that are in communication with the processing devices 32, and could include a relational database (such as an SQL database), or other suitable data storage devices. The data storage devices 34 are configured to host data 35 about the courses offered by the service provider. For example, the data 35 can include course frameworks, educational materials to be consumed by the users 14, records of assessments of users 14, assignments done by the users 14, records of assessments done by users 14 and a calculator for combining the assessments into one or more grades. There may also be various other databases and the like.

The data storage devices 34 may also store authorization criteria that define which actions may be taken by the users 12 and 14. In some cases, the authorization criteria may include at least one security profile associated with at least one role. For example, one role could be defined for users who are primarily responsible for developing an educational course, teaching it, and assessing work product from students, learners or individuals of the course. Users with such a role may have a security profile that allows them to configure various components of the course, to post assignments, to add assessments, to evaluate performance, to evaluate proficiency and so on.

In some cases, some of the authorization criteria may be defined by specific users 40 who may or may not be part of the educational community 16. For example, users 40 may be permitted to administer and/or define global configuration profiles for the educational system 10, to define roles within the educational system 10, to set security profiles associated with the roles, and to assign roles to particular users 12 and 14 who use the educational system 10. In some cases, the users 40 may use another computing device (e.g. a desktop computer 42) to accomplish these tasks.

The data storage devices 34 may also be configured to store other information, such as personal information about the users 12 and 14 of the educational system 10, information about which courses the users 14 are enrolled in, roles to which the users 12 and 14 are assigned, particular interests of the users 12 and 14 and the like.

The processing devices 32 and data storage devices 34 may also provide other electronic learning management tools (e.g. allowing users to add and drop courses, communicate with other users using chat software, etc.), and/or may be in communication with one or more other vendors that provide the tools.

The processing devices 32 can also be configured to implement an assessment engine which is operable to receive various assessments, such as but not limited to grade objects, related to an individual's performance, knowledge and/or proficiency that is being tested and combine the grade items to determine an overall result for the individual, as will be described in more detail with regards to FIGS. 2 to 6. A grade object is a type of assessment with an associated value that confers how an individual did for that particular type of assessment. Examples of grade objects include, but are not limited to, a quiz, a test, a mid-term examination, a lab report, a project, a proficiency in a given area (such as English language proficiency), and the like.

In some cases, the educational system 10 may also have one or more backup servers 31 that may duplicate some or all of the data 35 stored on the data storage devices 34. The backup servers 31 may be desirable for disaster recovery to prevent undesired data loss in the event of an electrical outage, fire, flood or theft, for example.

In some cases, the backup servers 31 may be directly connected to the educational service provider 30 but located within the educational system 10 at a different physical location. For example, the backup servers 31 could be located at a remote storage location that is some distance away from the service provider 30, and the service provider 30 could connect to the backup server 31 using a secure communications protocol to ensure that the confidentiality of the data 35 is maintained.

Figure 2A:
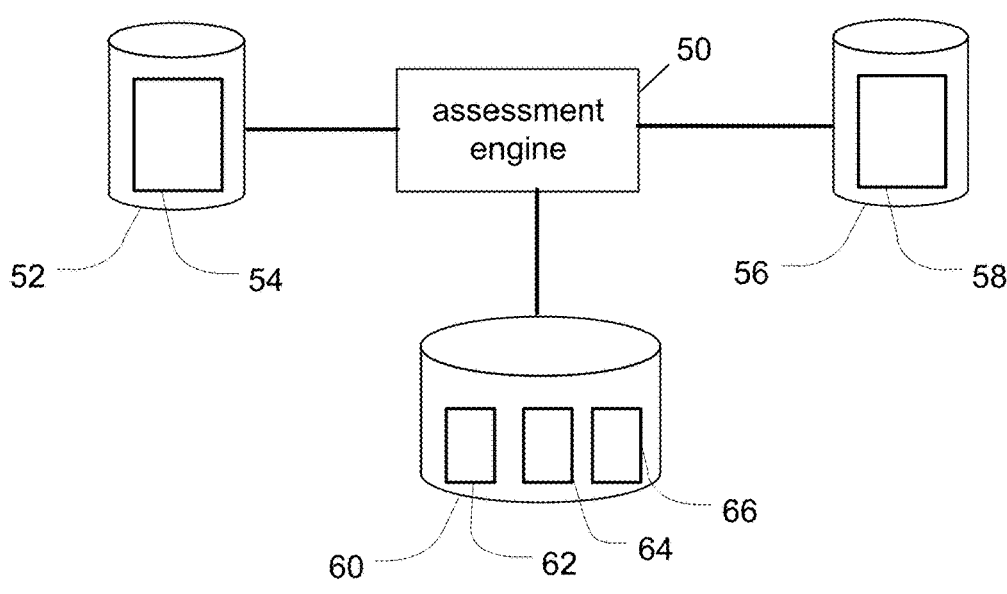
FIG. 2a is a block diagram illustrating input data that can be provided to an assessment engine and output data generated by the assessment engine when operating on the input data.

Referring now to FIG. 2*a*, shown therein is a block diagram illustrating various input data 54 that can be provided to an assessment engine 50 and output data 58 that is generated by the assessment engine 50 when operating on the input data 54. In this embodiment, the input data 54 is stored on a data store 52, which may, for example, be a database, a file or a collection files that are on a storage device such as RAM, ROM, a flash drive, a hard drive, a CD, a USB key, and the like. The output data 58 that is generated by the assessment engine can also be stored in, for example, a database, a file or a collection of files on the data store 56, which may be any suitable data storage device previously described. In an alternative embodiment, the input data 54 may be provided to the assessment engine 50 via entry by a user at a computing device that can operate or has access to the assessment engine 50 or the input data 54 may be provided via data communication to the computing device such as over a LAN, a WAN, via another suitable wired connection or via a wireless connection. In an alternative embodiment, the data store 56 can be the same as the data store 52, or another storage device or the output data 58 can be sent to another computing device via data communication to the computing device such as over a LAN, a WAN, via another suitable wired connection or via a wireless connection.

The input data 54 comprises a plurality of grade objects which comprise zero or more atom grade objects and zero or more aggregate grade objects. An atom grade object is a grade object that does not depend on another grade object to determine its value. In other words the atom grade has a value that is set explicitly. Examples of atom grade objects include, but are not limited to, a quiz, a test, an examination, a project report or a lab report and their corresponding values. The values of the atom grade objects may be processed by the assessment engine 50 according to zero or more contributor policies to prepare these grade objects for contribution to an aggregate grade. In general, a contributor policy is a rule that is applied to a grade object to transform the value of the grade object to a value that is suitable for use with the aggregator.

An aggregate grade object is a grade object that depends on other grade objects (i.e. contributor grade objects) to determine its value. The contributor grade objects are processed by the assessment engine 50 according to one or more contributor policies and are then aggregated by the assessment engine 50 according to an aggregator or aggregation function which is some sort of rule or function. A contributor grade object can be an atom grade object or an aggregate grade object. Examples of aggregate grade objects include, but are not limited to, a total quiz grade that is calculated from several quiz grades, a total lab score that is calculated from several lab report grades, or a mid-term grade that is calculated based on one or more test grades and one or more quiz grades.

After the assessment engine 50 generates an aggregate grade object, the assessment engine 50 may further process the aggregate grade object according to a set of result policies to generate a result grade object. The result grade object may then be stored, displayed or sent to another computing device. In general, a result contributor is a rule that is applied to an aggregate grade object to transform the value of the aggregator grade object to a form that is suitable for combination with other grade objects for further calculation of assessment or that is suitable for presentation to the individual being assessed, or a course instructor or another user.

In some embodiments, the result grade object may be run through a series of contributor policies for contribution to other aggregate grade objects (if any). In this case, the result grade object is an intermediate result grade object. This depends on the assessment structure that is used by the assessment engine 50 to determine how various grade objects are combined to generate aggregate grade objects and a result grade object. For example, referring to FIG. 5, the mid-term exam node 320 is an aggregate grade object that is combined with the final exam node 322, and the essays and quizzes nodes 304 and 306. The final exam node 322 is an atom grade object and the essays and quizzes nodes 304 and 306 are both aggregate grade objects.

Figure 5:
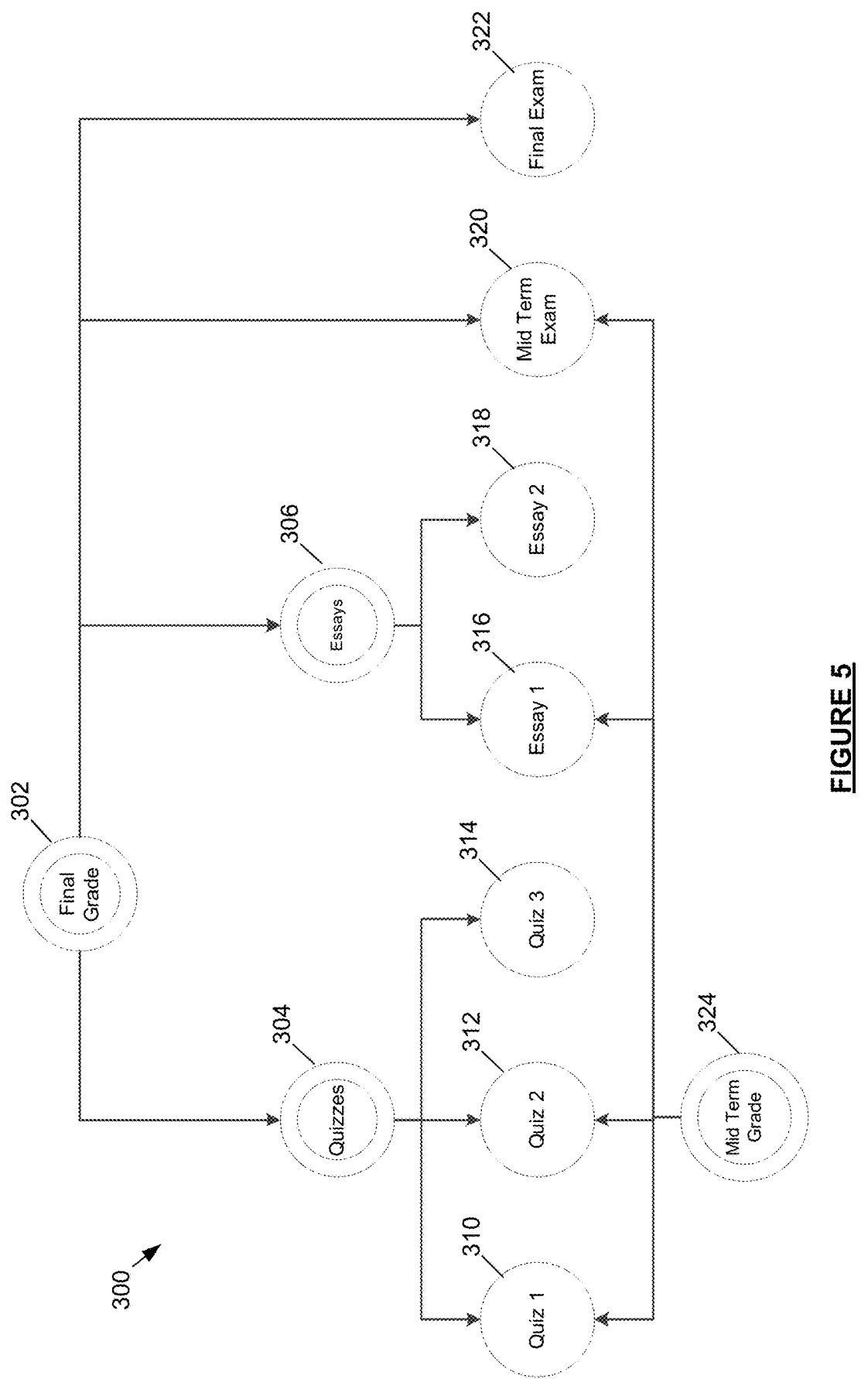
FIG. 5 is a block diagram illustrating an example of how various grade objects may be combined using an assessment structure to assess an individual.

Accordingly, in general, the assessment engine 50 is operable to receive various grade objects related to an individual's performance, knowledge and/or proficiency that is being tested or assessed, to process the grade items using one or more policies and functions and then to generate a resulting grade item for the individual. The processing is done according to an assessment structure, an example of which is shown in FIG. 5.

In one embodiment, the assessment engine 50 uses a directed acyclic graph (DAG) to define and implement the assessment structure by using a suitable high-level computer language and making sure that there are no cyclic dependencies. A DAG is a mathematical graph that has the two properties of: (1) having no cycles, i.e. there is no traversal of the graph that results in a loop and (2) being directed, meaning that a node "a" referencing a node "b" does not imply that node "b" references node "a" (as is the case in an undirected graph). The DAG is built by recursively loading an aggregate node and its contributor nodes, which in turn could be aggregate nodes with their own contributors (this is the recursive nature of the loading) or could be an atom node. The aggregate node that starts the process is dependent on the context in which the assessment is being used. In other words, any node in the graph could be the starting point for the recursive loading function.

In alternative embodiments, the assessment engine 50 can implement other assessment structures rather than a DAG. For example, the assessment engine 50 can use a hash table and in some cases a tree structure can be used when a contributor grade object only contributes to one aggregate object since there can only be one parent in a tree structure.

In the context of the assessment engine 50, using a DAG as the assessment structure, each node represents either an atom grade object or an aggregate grade object. For example, again referring to FIG. 5, nodes 304, 306 or 324 labeled quizzes, essays and mid-term grade respectively are aggregate grade objects and the dependencies of these nodes are grade objects that are used to generate a value for the node. The Quizzes node 304 has a value that is calculated using the values of the dependencies of Quiz 1 grade object 310, Quiz 2 grade object 312 and Quiz 3 grade object 314. The dependencies are run through a pipeline of zero or more defined contributor policies in preparation for an aggregation function. The aggregation function is then run on these prepared dependencies; and the output or result of the aggregation function is run through another pipeline of zero or more defined result policies. When there are zero contributor policies and zero results policies that are applied, then this may be viewed as applying an aggregator to a series of grade objects in which there is no pre-processing of the grade objects and no post-processing of the aggregate grade object generated by the aggregator so the aggregate grade object becomes the result grade object.

Referring again to FIG. 2a, the policies, aggregation functions and assessment structure used by the assessment engine 50 can be stored as a first, a second and a third collection of files 62, 64 or 66 on a data store 60. The data store 60 can be implemented as previously described for the data stores 52 and 56. In some embodiments, the data store 52, 56 and 60 may be the same element or device. The first collection of files 62 includes a set of predefined contributor policies, aggregation functions and result policies that can be defined by a creator or vendor of the educational system 10. The second collection of files 64 includes at least one of one or more predefined contributor policies, one or more predefined aggregation functions and one or more predefined result policies that can be defined by a third party vendor. The term predefined indicates that these elements are not created by a user of the education system 10. The third collection of files 66 includes at least one of one or more contributor policies, one or more aggregation functions and one or more result policies that a user, such as a system administrator, of the education system 10 can define as they are working with the assessment engine 50 and generating different assessment structures to process grade objects in a customized fashion. It should be noted that the second and third collection of files 64 and 66 may be optional.

Figure 2B:
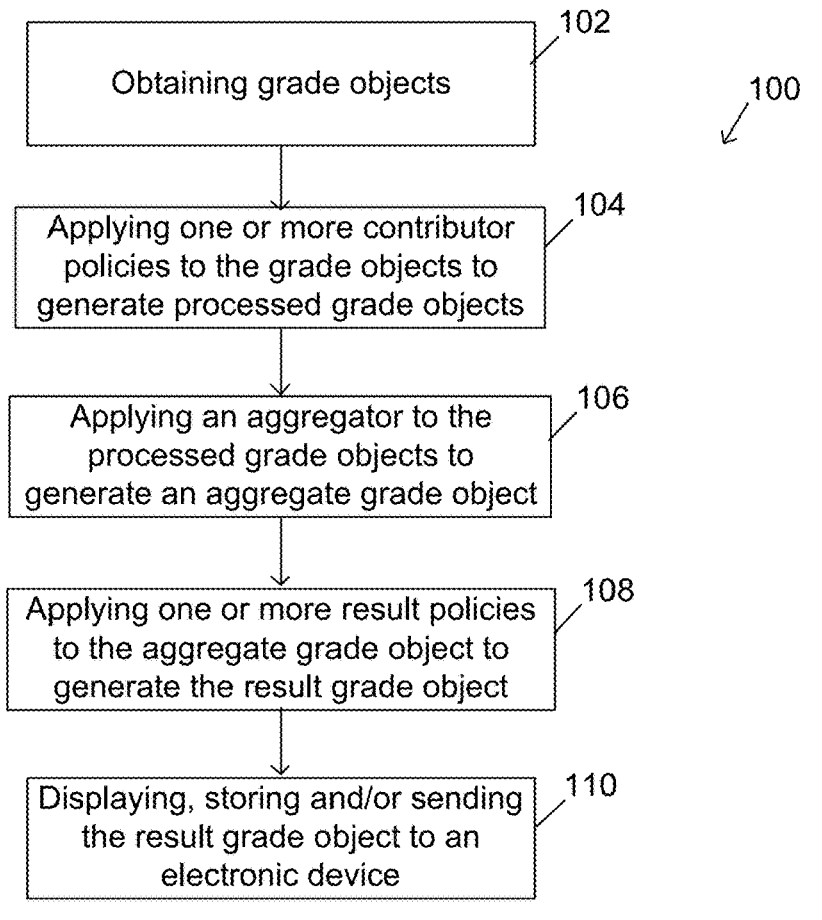

Referring now to FIG. 2b, shown therein is a flow chart diagram illustrating an example embodiment of an assessment method 100 for assessing an individual that can be implemented by the assessment engine 50 of FIG. 2a. The assessment method 100 can be used to process a plurality of grade objects and the functionality of the assessment engine 50 can be implemented by at least one processor.

At 102, the method 100 includes obtaining a plurality of grade objects including the grade value associated with each grade object. This can be done in a variety of ways. For example, the plurality of grade objects may be stored in a data store that can be accessed by the assessment engine 50 or the plurality of grade objects may be entered by a user as previously explained. The relationship amongst the grade objects is defined according to the assessment structure, as example of which is shown in FIG. 5. The individual who is using the assessment engine 50 can define the assessment structure by specifying for each aggregate node the number of contributor nodes and their relationship with one another which is defined by selecting zero or more contributor policies, an aggregation function and zero or more result policies for each aggregate node as well as any parameters that are needed for the various policies and the aggregation function for that particular aggregate node. This may be done by using a series of windows that prompt the user to define each aggregate node and provide the previously stated information for each aggregate node. In some embodiments, other mechanisms can be used to generate the assessment structure. For example, there can be a number of pre-defined assessment structures from which the user can select or the assessment structure can be generated based on a template that defines a course structure and there could be various course templates from which a user can select. A template for a course structure can define the number of tests, assignments, exams and the like that are used in the course.

At 104, the method 100 includes applies applying zero or more contributor policies to the plurality of grade objects to generate a set of processed grade objects. In other words, a contributor policy can be implemented as a software module (such as a software object in object oriented programming) that accepts a collection of contributing grade objects, modifies those grade objects in some way, and returns the modified collection as the set of processed grade objects. Examples of the contributor policies include, but are not limited to, scaling a value of a grade object according to a defined weight or a defined value, excluding grade objects for an assessment (such as a test, exam, quiz, report, presentation and the like) that the individual has been exempted from taking, and dropping at least one of the highest X number of grade objects or the lowest Y number of grade objects where X and Y are integers. It should be noted that applying a weight of zero can be done to exclude a grade object associated with an assessment that the individual was exempted from participating in. Another example of a contributor policy is to convert one or more grade objects to a bonus grade object. The value of a bonus grade object is added "on top" (e.g. the numerator) of the result of the aggregate function, i.e. the value of the bonus grade object does not contribute to the denominator of the output of the aggregation function. Another example of a contributor policy can be to scale grade objects to be scored using a common value, such as being scored out of 25.

At 106, the method 100 includes applying an aggregator to the set of processed grade objects to generate an aggregate grade object. The aggregator, which can also be referred to as an aggregation function, applies a function to the set of processed grade objects to combine the grade objects into a single aggregated grade object which is a new grade object. Examples of aggregation functions include, but are not limited to, various statistical functions, such as summing the contributor grade objects, averaging the contributor grade objects, finding the standard deviation of the contributor grade objects, determining the median of the contributor grade objects, determining the mode of the contributor grade objects, determining the minimum of the contributor grade objects, determining the maximum of the contributor grade objects, applying a Boolean logic expression to the contributor grade objects or evaluating a numeric formula using the contributor grade objects as inputs to the formula. Another example of an aggregation function is to choose a random contributor grade object from a set of contributor grade objects.

At 108, the method 100 includes applying zero or more result policies to the aggregate grade object to generate a result grade object. The result policies comprise rules such as, but not limited to, limiting the value of the numerator to be less than or equal to the value of the denominator if the aggregate grade object is a fraction and bonus points are available (e.g. limiting a grade object to 100% such as limiting the value 31/30 to 30/30); setting the result grade object to a discrete value from a set of discrete values that is closest to the value of the aggregate grade object (e.g. for discrete values 50% and 100%, an aggregate grade object with a value of less than 50% would have a result grade object with a value of 50% and an aggregate grade object with a value between 50% and 100% would have a result grade object with a value of 100%).

At 110, the result grade object can be stored on the data store 56 and/or sent to another computing device and/or displayed on a display and/or printed to a hardcopy for an instructor, the individual being tested or other person to see.

Figures 3, 4:
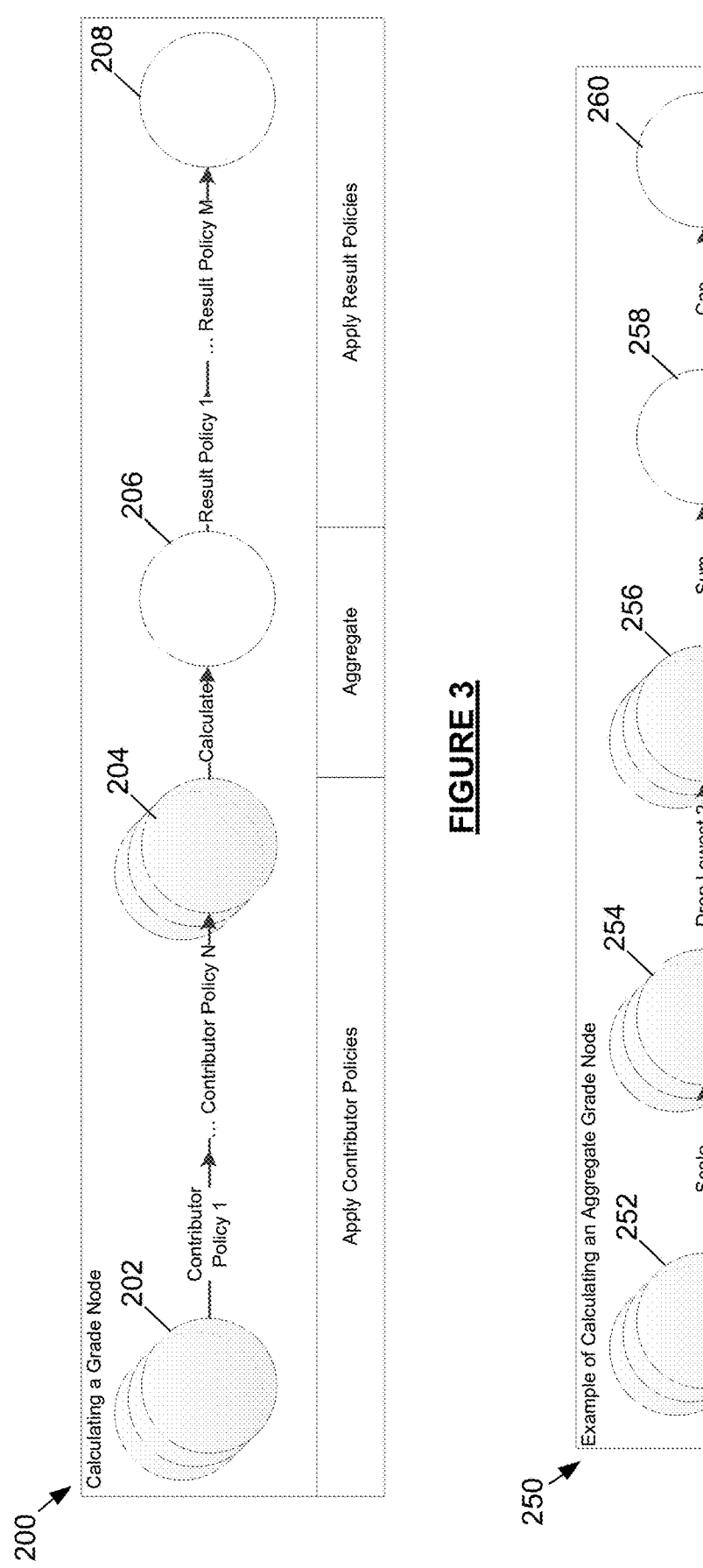
FIG. 3 is an alternate illustration of the method of FIG. 2b shown in schematic form.
FIG. 4 is an illustration of a particular example of the assessment method of FIG. 2b.

Referring now to FIG. 3, shown therein is an alternate illustration of the assessment method 100 of FIG. 2b shown in schematic form for calculating a value for an aggregate grade object in an assessment structure. In this example embodiment, several grade objects 202 are processed according to one or more contributor policies (up to N contributor policies are possible where N is a positive integer greater than or equal to 0) to generate a set of processed grade objects 204. It should be noted that the number of processed grade objects 204 may not be the same as the initial number of grade objects 202 due to the type of contributory policies that may be applied. An aggregator function is applied to the set of processed grade objects 204 to obtain an aggregate grade object 206. The aggregate grade object 206 is then processed according to one or more result policies (up to M result policies are possible) to generate a result grade object 208.

Referring now to FIG. 4, shown therein is an illustration of a particular example of the operation of the assessment method 100 of FIG. 2b. In this case, the contributor policies are defined as scaling the values of the grade objects and dropping the grade objects with the lowest two values. In particular, the grade objects 252 are scaled so that they are all scored on the same scale (such as having the same denominator for example) to obtain processed grade objects 254. The processed grade objects 254 are then processed by removing the two grade objects with the lowest values to obtain the processed grade objects 256. The aggregator function is defined as the sum. Accordingly, the processed grade objects 256 are summed together to generate the aggregate grade object 258. The result policy is defined as limiting or capping the value of the aggregate grade object 258 to be less than 100% thereby generating the result grade object.

Referring now to FIG. 5, shown therein is a block diagram illustrating an example of how various grade objects may be combined to assess an individual. The grade objects with double circles are aggregate grade objects and the grade objects with single circles are atom grade objects. The grade objects are related to one another according to the assessment structure based on the directed arrows where an arrow from a first node that points to one or more second nodes indicates that the value of the one or more second nodes contribute to the value of the first node. The structure also illustrates that not every grade object has to directly participate (i.e. be directly connected) to the value of the final result grade object. For example, the value of the Quizzes node 304 is determined by applying zero or more contributory policies, an aggregator function and zero or more result policies to the Quiz 1, Quiz 2 and Quiz 3 grade objects 310 to 314. The value of the Essays node 306 is determined by applying zero or more contributory policies, an aggregator function and zero or more result policies to the Essay 1 and Essay 2 grade objects 316 and 318. The values of the Mid Term node 306 is determined by applying zero or more contributory policies, an aggregator function and zero or more result policies to the Quiz 1 and Quiz 2 grade objects 310 and 312, the Essay 1 grade object 316 and the Mid-Term exam grade object 320. Finally, the value of the Final grade node is determined by applying zero or more contributory policies, an aggregator function and zero or more result policies to the Quizzes grade object 304, the Essays grade object 306, the Mid-Term exam grade object 320 and the final exam grade object 322. It should be noted that the contributor policies, aggregation function and result policies used to obtain a result grade object can be different for different result grade objects within the same assessment structure. It should be noted that as used herein the term node is synonymous with the term grade object.

A user of the assessment engine 50 can define the assessment structure by editing a current grade object to specify the grade objects, the contributor policies, the aggregation function and the result policies that may be used to generate a value for the current grade object. The user may first be presented with a first input window to define the initial set of grade objects. The user may then be presented with a second input window in which to select the contributor policies and the order in which they should be applied. The user may then be presented with a third input window to select an aggregation function. The user may then be presented with a fourth input window to select the result policies and the order in which they should be applied. The choices for these different input windows may be presented to the user as some sort of list (e.g. drop-down list, scrollable list, etc.) or as buttons that the user would select and the user can then perform an action (such as select, drag and drop, or click a button) to make the desired selections. It should be noted that the user may also be prompted to provide values for any parameters that are required by the contributor policies or the result policies that are selected. The user can then apply the choices that have been made. The user can repeatedly edit grade nodes in this fashion in order to generate the assessment structure. The at least one processor of a computing device of the educational system 10 can provide these input windows to the user, receive the selections made by the user and then generate the assessment structure which would be used by the assessment engine 50 during operation.

Figure 6:
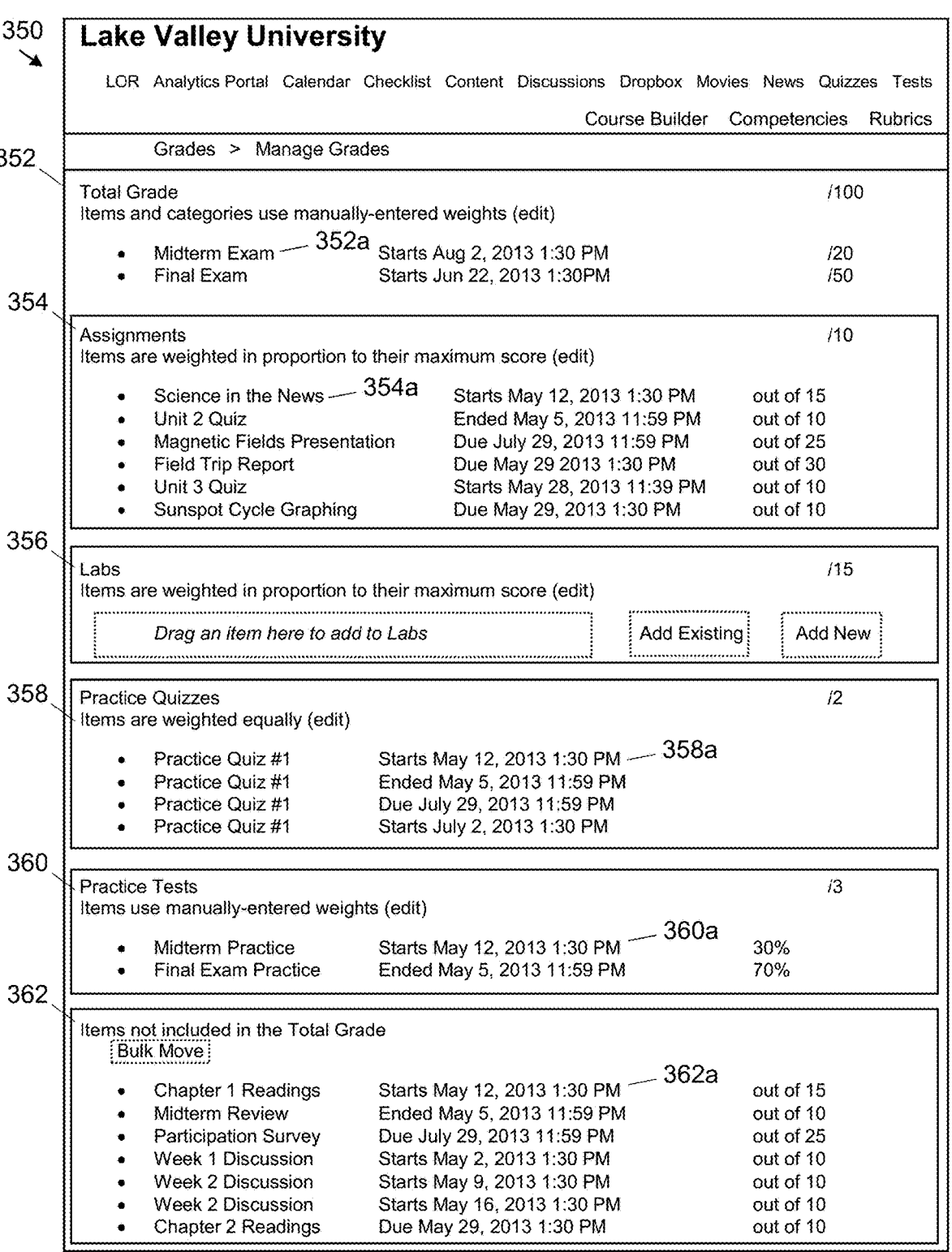
FIG. 6 is an illustration of an example embodiment of a graphical user interface that can be used to assess an individual who is taking an educational course.

Referring now to FIG. 6, shown therein is an illustration of an example embodiment of a Graphical User Interface (GUI) 350 that can be used to assess an individual who, in this example, is taking an educational course. In general, the GUI 350 is associated with a user profile. One or more users, such as course instructors or system administrators may interact with the GUI 350 to generate an assessment structure and enter in values for various grade objects that are then used to generate values for aggregate grade objects, intermediate result grade objects and a final grade object. An intermediate result grade object can be a grade object with a value that is defined using the method 100 but then the value of the intermediate result grade object can be used to determine another intermediate result grade object or a final result grade object. For example, referring to FIG. 5, the Quizzes, Mid-Term and Essays grade objects 304, 324 and 306 are intermediate result grade objects that are used to determine a value for the final grade object 302 which is a final result grade object.

Referring again to FIG. 6, the GUI 350 includes various GUI objects that define different types of assessments that have been or will be done and will then be combined to determine a total grade. The GUI objects are generally various features provided by the GUI 150. For example, the GUI objects may include indicators (e.g. icons), files, graphic elements, control elements, and any other features. In general, the GUI 350 includes a plurality of aggregate grade objects (e.g. Assignments 354, Labs 356, Practice Quizzes 358 and Practice Tests 360), intermediate result grade objects (none are shown in the example of FIG. 5) and a final result grade object 352 (the total grade). There are also grade objects that do not contribute to any other grade objects as indicated at 362 and 362a. Each of the aggregate grade objects 354, 358 and 360 and the final result grade object 352 have values that are defined by grade objects 352a, 354a, 358a and 360a respectively (only one of the grade objects in each of these sections are labeled with reference numerals for simplicity). A user could select one of the grade objects 352a, 354a, 358a and 360a and enter a value. A user could also select one of the aggregate grade objects 354, 358 and 360 and the final result grade object 352 and add other contributing grade objects as needed.

It should be noted that the various embodiments of the assessment engine and method described herein can be used for various types of assessments such as assessing for competencies or proficiency since the assessment structure can be tailored and the values of the grade objects do not have to be numerical. For example, the value of a grade object can be TRUE, FALSE, PASS or FAIL and need not be only numeric and may be combined or processed using Boolean logic functions. Furthermore, it may be possible to combine various proficiencies to get an overall proficiency for a particular subject matter. For example, for an individual to be proficient in English the individual would have to be proficient in English grammar, English speaking, and English writing, which can all be defined as grade objects and combined using the appropriate assessment structure and the assessment engine 50 and associated method described herein.

In an alternative embodiment, the assessment engine 50 is further configured to inform the individual being assessed of how the individual must perform on any remaining assessment in order to achieve a certain final grade result. This can be referred to as a required performance advising feature. This can be implemented by pre-emptively providing the value for a grade object before having all of the values of the nodes that are used by the assessment structure (i.e. looking up the explicit value for an atom grade object or evaluating the value of an aggregate grade object). One way to achieve this is to determine the values of the contributor grade objects that are needed in order to obtain a desired value of D for the aggregate grade object, populate a cache with those values, and then check the cache before using the normal evaluate mechanism for the assessment structure. The cache would allow values to be looked up by an identifier that refers to a specific grade object. Before the assessment engine 50 performs a calculation of the value of a current grade object it is evaluating, it would first check this cache for the presence of a value for the current grade object. If this value is present, the normal evaluation would be avoided, and the value from the cache would be used. The cache then acts as an override to the normal evaluation process, and allows for other components to participate in the evaluation, such as in the required performance advising feature that was just explained as one example.

The various embodiments described herein with regards to the assessment engine and associated assessment method allow for at least one of future contributor policies, aggregator functions and result policies to be developed and integrated without any impact to the existing policies or aggregation functions. This is in contrast with other assessment methods in which the assessment is hardcoded, using Boolean operators for instance which would be implemented using if-than structures. Users, such as administrators, can set up any desired assessment structure and select particular contributor policies, aggregation functions and result policies to control how the value of a grade object is determined or calculated. The user also has the ability to modify the at least one of the assessment structure, one or more contributory policies, one or more aggregator functions and one or more result policies to change how a value for a grade object is determined. The assessment structure and the assessment engine, as well as the fact that the contributor policies, result policies and aggregation functions can be separately and independently defined, allows one to test one of the policies or aggregation functions in isolation. In addition, the policies and aggregation functions can be used interchangeably with one another which provides for greater flexibility and ease of use. This is in contrast to conventional grading methods in which the method must be recoded to be modified. Accordingly, the assessment structures, engines and methods described herein allow for a user who does not know how to program a computer to more easily, more quickly and more accurately create or modify an assessment structure, which is not possible when using conventional techniques.

It should be noted that at least some of the components described herein are capable of being distributed in a computer program product comprising a computer readable medium that bears computer usable instructions for one or more processors. The medium may be provided in various forms such as, but not limited to, certain non-transitory computer readable mediums such as one or more diskettes, compact disks, tapes, chips, USB keys, external hard drives, and magnetic and electronic storage media. In other cases, the medium may be provided in various forms such as, but not limited to, wire-line transmissions, satellite transmissions, wireless transmissions, internet transmissions or downloads, digital and analog signals, and the like. The computer useable instructions may also be in various forms, including compiled and non-compiled code.

Essay writing is an important component of public education and most university programs. Students are often expected to complete tasks in response to a given topic or question and are evaluated on different qualitative dimensions such as the depth of their analysis, writing style or quality of prose. In order to improve their writing, students require effective and specific feedback on these different dimensions. Though it is commonly accepted as a best practice to give specific student feedback, there is growing recognition that students are dissatisfied with the level of feedback given on their assignments. As class sizes grow, there is demand for automated systems that can offer in-depth automated assignment feedback, which requires minimal or no human e ort to deliver.

Automated Essay Scoring (AES) is an ongoing area of research involving the prediction of grades related to a student's submitted work. Often involving ma-chine learning, most of the research in this field concerns treating the prediction of scores as supervised learning tasks. Human-generated data is treated as a gold standard and automated tools are built to learn from these scores and replicate them as accurately as possible. State-of-the-art AES systems have demonstrated high agreement with human generated essay scores, and have been reviewed extensively. Recently, the subject has received renewed attention, in part because of the release of the Automated Student Assessment Prize (ASAP) Competition data by the Hewlett Foundation1. This data contains a large number of student written essays paired with multi-dimensional rubric data used to assign grades to the essays. Widespread access to rich essay data has created new possibilities for improving AES, especially with respect to testing approaches that work across multiple domains and essay question prompts. While much of the early research in AES involves improving on prediction tasks to specific essay questions, much of the recent research concerns identifying algorithms that can help automate generic written prompts.

A different perspective on the task of AES may be taken. Detailed rubrics are often used to give specific qualitative feedback about ways of improving writing, based among others on stylistic elements contained in the text itself. The task of rubric prediction can be treated as a way of generating detailed feedback for students on the different elements of writing, based on the characteristics typical of a student's performance. This is fundamentally similar to the task of author attribution, which is a task of recognizing an author of a written text based on known samples of writing of candidate authors.

Techniques developed in author attribution, which aim at classifying text by its authorship style, may be relevant to the task of essay rubric grade prediction, as the quality of essays are often determined by stylistic elements. The teachings herein explore the application of the Common N-Gram (CNG) classifier, proposed for authorship attribution, and frequently used in problems related to authorship analysis, to the task of rubric value prediction. Using the before mentioned ASAP data, performance of CNG algorithm to two other classifiers is compared: linear SVM with SGD learning and Naive Bayes algorithm, and also compare the results to the reference of the inter-rater agreement between human raters. Analysis is performed on the suitability of different features in document representation, as well as feature weighting scores and ways of dealing with unbalance of marks.

Related Work

Automated Essay Scoring and Feed Back

Automated Essay Scoring is not a new concept. The earliest AES systems date back to the 1960's, and AES systems are widely adopted today. Perhaps the most notable commercial AES is e-Rater, which is used to evaluate second-language English capabilities on the Test of English as a Foreign Language (TOEFL) and essay rating of the Graduate Record Examination (GRE). More recently, AES systems are employed to enhance the capabilities of Massive Open On-line Courses (MOOCs) by providing scalable automated essay evaluation. For instance, Berkeley-based Gradescope has been used to evaluate over 10 million pages of work, driven in large part by the advancement of MOOCs at the institutions it services.

Much of the work on AES treats automated grading as a supervised learning problem. The e-Rater system, for instance, uses natural language processing techniques to perform feature extraction related to specific writing domains such as grammar, usage, mechanics and style. It then uses these features to predict the domains using stepwise linear regression. Systems like this rely on large amounts of task-specific writing samples and a number of manually labelled samples to replicate the human-generated grades. Later work also treats AES as a linear regression problem, but seeks to overcome the requirement for task-specific samples through domain adaptation. Other works have treated AES as a classification problem, and have leveraged the ASAP dataset to demonstrate their approach. These teachings treats AES as a classification problem and predicts the rubric grades assigned manually by the graders.

Author Attribution & Common N-Gram Classifier

A task of detecting who among candidate authors wrote a considered text is a widely study problem called authorship attribution, with applications in fields like forensics, literary research and plagiarism detection. The Common N-Gram (CNG) classifier was originally proposed for the problem of authorship attribution. CNG is based on a similarity measure between documents relying on differences between frequencies of the character n-grams. Techniques are applied to the AES task {a classification task related in large extend to the data written style.

The CNG similarity, or its variants, has been successfully applied to tasks related to authorship analysis of texts. It has been also found useful for other classification tasks, for example genome classification, recognition of music composers, Alzheimer's disease detection and financial forecasting. It has also been explored in the context of Automated Essay Scoring but has not been evaluated using a popular dataset.

Methodology

Prediction of the rubric grade was performed through supervised classification. The classification is performed separately for each dimension in an evaluation guideline (rubric), such as \Style", \Organization", etc., with possible marks for the dimension being class labels, and classifiers trained using marks given by human raters. For a rubric dimension, a mark is associated with its criteria, thus such a predicted mark provides a detailed feedback to a student.

We applied three classification algorithms: Common N-Gram (CNG) classifier, linear Support Vector Machine (SVM) with stochastic gradient descent (SGD) learning, and Multinomial Naive Bayes (NB).

The representation of documents is based on n-grams of characters or words. We also tested \stemmed word" n-grams, which are word n-grams extracted from text after it has been pre-processed by removing stop words and stemming of the remaining words.

A representation of a document used by CNG is a list of the most frequent n-grams of a particular type, coupled with their frequency normalized by the text length (such a representation is called a \pro le"). The total number of unique n-grams in a document was set as the length of a pro le. Training data for a class is represented by CNG as a single class document, created by concatenating all training documents from the class. For SVM and NB, we used a typical bag-of-n-grams representation (using a particular n-gram type as features), with either raw counts or tfidf scores as weights.

We applied steps to mitigate the effect of unbalanced training data (different numbers of training documents available for different classes {marks). For SVM and NB, we performed classification either using the original training data, or using training data after applying random upsampling of minority classes: for classes other than the majority class, data was upsampled with replacement, to match the size of the majority class [26]. CNG does not treat a class as a set of separate training instances, but is known to be sensitive to the situation when due to a different number of unique n-grams, different classes are represented by pro les of different lengths [13]. We alleviated this problem by truncating all class pro les to the same length (the maximum length possible).

Experiments were performed on essays of three ASAP datasets2: set 2, set 7 and set 8. Each set contains essays for a particular prompt. These three sets of essays are chosen for experiments (out of eight sets available in the dataset), because for these sets marks assigned to individual dimensions of the evaluation guideline rubric (such as "Style", "Organization", etc.) are available. Table 1 presents information about the essay sets.

For each rubric dimension, grades from two raters are available. Classification is performed for each dimension and each rater separately, and so there are 24 classification tasks in total.

The number of classes (number of different marks) is 4 for all sets and dimensions except for "Writing Applications" in set 2, in which the number of classes is 6. For set 8, our classification is for 4 classes, but the original scale of marks has 6 marks: from 1 to 6. We combined for this set mark 1 with mark 2, and mark 6 with mark 5 (so that in our experiments for this set class "2" means "at most the original mark 2", and class "5" means "at least the original mark 5"). This was done because the marks 1 and 6 are very rare in the set: often there are fewer than 5 essays of a given mark for a particular dimension/rater, which is not enough to have each fold in our cross-validation setting to have at least one test document for a mark.

TABLE 1

Information about ASAP datasets used in experiments.

| | name | | |
| | set2 | set7 | set8 |
|---|---|---|---|
| grade level | 10th | 7th | 10th |
| # of essays | 1800 | 1569 | 723 |
| average # of words | 381 | 168 | 606 |
| rubric dimensions | "Writing Applications" | "Ideas" | "Ideas and Content" |
| | "Language Conventions" | "Organization" | "Organization" |
| | | "Style" | "Voice" |
| | | "Conventions" | "Word Choice" |
| | | | "Sentence Fluency" |
| | | | "Conventions" |

Experimental Settings

We performed experiments for 13 feature sets: character n-grams of the length from 2 to 10, and word and stemmed word n-grams of the length of 1 and 2.

For each of 13 feature sets, one classification by CNG was performed (with normalized frequency of n-grams), while for SVM and NB each, four classifications were performed, for the combinations of two types of n-gram weights (counts/t df scores) and two types of processing of unbalanced training data (upsampling/no upsampling).

The performance measure used in the experiments is Quadratic Weighted Kappa (QWK), a common measure for evaluating agreement between raters (which has been also used in the evaluation of the competition for which the ASAP dataset was originally prepared3). Kappa is a measure for inter-rater agreement that takes values between −1 and 1, with 0 corresponding to an agreement that would be expected by chance, 1 corresponding to a perfect agreement, and negative values corresponding to agreement that is worse than by chance. Quadratic Weighted Kappa is Kappa with quadratic weights for distances between classes, which accounts for ordinal classes (marks). For each set/dimension combination, we also report the QWK between the two human raters, which pro-vides a useful reference to the values of QWK between results of a classifier and a human rater.

Testing was performed using 5-fold stratified cross-validation, separately for each task (i.e., a dimension/rater combination). Statistical significance of differences of classifier results was tested by paired two-tailed t-test for averages over folds (the level of p<0:05 was considered statistically significant).

For SVM with SGD learning and for Multinomial Naive Bayes we used implementations of the classifiers from Scikit-learn Python library [27]. For CNG classifier, the package Text::Ngrams was used to extract pro les of the n-grams and their frequency from texts (tokens denoted as \byte" and \word" were used for character and word n-grams, respectively). For SVM and NB classifiers, feature extraction was performed using CountVectorizer of Scikit-learn library (using tokens denoted as \char" and \word"). Processing of documents in order to extract \stemmed word" n-grams was performed using Snowball Stem-mer and the English stop words corpus from the nltk platform (the stop words corpus was extended by the following clitics: 's, 've, 'd, 'm, 're, 'll, n't). The package imbalanced-learn was utilized to perform the upsampling of training data.

TABLE 2

Best QWK results for CNG, SVM and NB classifiers for set 2. For each task, the best overall result is bold.

| | | | set2 | | | | | | |
|---|---|---|---|---|---|---|---|---|---|
| | | | "Writing Applications": Inter-rater agreement QWK = 0.814 | | | | | | |
| | | rater 1 | | | | rater 2 | | | |
| classifier | best parameters | | QWK | diff | best parameters | | | QWK | diff |
| CNG | | char 4 | 0.515 | 37% | | | char 6 | 0.516 | 37% |
| SVM | tfidf | upsampl. char 6 | 0.567$_\ddagger$ | 30% | tfidf | upsampl. | char 6 | 0.571*$_\ddagger$ | 30% |
| NB | counts | upsampl. word 1 | 0.501 | 38% | counts | upsampl. | char 3 | 0.499 | 39% |

| | | | "Language Conventions": Inter-rater agreement QWK = 0.802 | | | | | | |
|---|---|---|---|---|---|---|---|---|---|
| | | rater 1 | | | | rater 2 | | | |
| classifier | best parameters | | QWK | diff | best parameters | | | QWK | diff |
| CNG | | char 4 | 0.562 | 30% | | | char 4 | 0.541 | 33% |
| SVM | tfidf | upsampl. char 5 | 0.570 | 29% | tfidf | upsampl. | char 4 | 0.567 | 29% |
| NB | counts | upsampl. stem 1 | 0.540 | 33% | counts | upsampl. | stem 1 | 0.539 | 33% |

Statistical significance (p < 0.05) of differences between QWK and task-specific baselines is annotated by *, †, ‡, denoting results higher than the best (in the task) result of, respectively, CNG, SVM with tfidf and upsampling, NB with counts and upsampling.

Tables 2, 3, 4 present for each classification task the best result for CNG, SVM and NB classifiers (over all tested parameter settings). For each rubric dimension4, the QWK of the inter-rater agreement (between rater1 and rater2) is also stated, as a reference. By \di" we denoted the relative difference between an inter-rater QWK and a classifier QWK, i.e., the difference between the interrater QWK and the classifier QWK as a percentage of the inter-rater QWK.

TABLE 3

Best QWK results for CNG, SVM and NB classifiers for set 7. For each task, the best overall result is bold.

| | | | set7 | | | | | | |
|---|---|---|---|---|---|---|---|---|---|
| | | | "Ideas": Inter-rater agreement QWK = 0.695 | | | | | | |
| | | rater 1 | | | | rater 2 | | | |
| classifier | best parameters | | QWK | diff | best parameters | | | QWK | diff |
| CNG | | char 4 | 0.657 | 6% | | | char 4 | 0.625 | 10% |
| SVM | tfidf | upsampl. char 5 | 0.645 | 7% | tfidf | upsampl. | char 4 | 0.619 | 11% |
| NB | counts | upsampl. char 4 | 0.652 | 6% | counts | no sampl. | char 3 | 0.628 | 10% |

| | | | "Organization": Inter-rater agreement QWK = 0.577 | | | | | | |
|---|---|---|---|---|---|---|---|---|---|
| | | rater 1 | | | | rater 2 | | | |
| classifier | best parameters | | QWK | diff | best parameters | | | QWK | diff |
| CNG | | char 4 | 0.452 | 22% | | | char 4 | 0.449 | 22% |
| SVM | tfidf | upsampl. char 6 | 0.508* | 12% | tfidf | upsampl. | char 6 | 0.515* | 11% |
| NB | counts | upsampl. char 5 | 0.480 | 17% | counts | no sampl. | char 4 | 0.476 | 18% |

TABLE 3-continued

Best QWK results for CNG, SVM and NB classifiers for set 7. For each task, the best overall result is bold.

"Style": Inter-rater agreement QWK = 0.544

| classifier | rater 1 best parameters | | | QWK | diff | rater 2 best parameters | | | QWK | diff |
|---|---|---|---|---|---|---|---|---|---|---|
| CNG | | | char 4 | 0.441 | 19% | | | char 5 | 0.407 | 25% |
| SVM | tfidf | upsampl. | char 5 | 0.480 | 12% | tfidf | upsampl. | char 5 | 0.493* | 9% |
| NB | counts | upsampl. | char 3 | 0.442 | 19% | counts | no sampl. | char 3 | 0.454 | 17% |

"Conventions": Inter-rater agreement QWK = 0.567

| classifier | rater 1 best parameters | | | QWK | diff | rater 2 best parameters | | | QWK | diff |
|---|---|---|---|---|---|---|---|---|---|---|
| CNG | | | char 3 | 0.384 | 32% | | | char 4 | 0.423 | 15% |
| SVM | tfidf | upsampl. | char 4 | 0.428‡ | 25% | tfidf | upsampl. | char 5 | **0.486*‡ | 14%** |
| NB | counts | upsampl. | char 3 | 0.366 | 35% | counts | no sampl. | char 3 | 0.433 | 24% |

Statistical significance (p < 0.05) of differences between QWK and task-specific baselines is annotate by *, †, ‡, denoting results higher than the best (in the task) result of, respectively, CNG, SVM with tfidf and upsampling, NB with counts and upsampling.

TABLE 4

Best QWK results for CNG, SVM and NB classifiers for set 8. For each task, the best overall result is bold.

set8
"Ideas and Content": Inter-rater agreement QWK = 0.523

| classifier | rater 1 best parameters | | | QWK | diff | rater 2 best parameters | | | QWK | diff |
|---|---|---|---|---|---|---|---|---|---|---|
| CNG | | | char 4 | 0.475 | 9% | | | char 5 | 0.394 | 25% |
| SVM | tfidf | upsampl. | char 4 | 0.418 | 20% | tfidf | upsampl. | char 5 | 0.342 | 34% |
| NB | counts | upsampl. | char 3 | 0.482‡ | 8% | counts | no sampl. | char 3 | 0.374 | 28% |

"Organization": Inter-rater agreement QWK = 0.533

| classifier | rater 1 best parameters | | | QWK | diff | rater 2 best parameters | | | QWK | diff |
|---|---|---|---|---|---|---|---|---|---|---|
| CNG | | | char 5 | 0.453 | 15% | | | char 5 | 0.377 | 29% |
| SVM | tfidf | upsampl. | char 4 | 0.427 | 20% | tfidf | upsampl. | word 1 | 0.317 | 40% |
| NB | counts | no sampl. | char 3 | 0.455‡ | 15% | counts | no sampl. | char 3 | 0.329 | 38% |

"Voice": Inter-rater agreement QWk = 0.456

| classifier | rater 1 best parameters | | | QWK | diff | rater 2 best parameters | | | QWK | diff |
|---|---|---|---|---|---|---|---|---|---|---|
| CNG | | | char 4 | 0.440 | 4% | | | word 1 | 0.377 | 17% |
| SVM | tfidf | upsampl. | char 4 | 0.389 | 15% | tfidf | upsampl. | char 3 | 0.315 | 31% |
| NB | counts | upsampl. | char 3 | 0.377 | 17% | counts | upsampl. | char 3 | 0.343 | 25% |

"Word Choice": Inter-rater agreement QWK = 0.477

| classifier | rater 1 best parameters | | | QWK | diff | rater 2 best parameters | | | QWK | diff |
|---|---|---|---|---|---|---|---|---|---|---|
| CNG | | | char 4 | 0.493 | −3% | | | char 5 | 0.431‡ | 10% |
| SVM | tfidf | upsampl. | char 3 | 0.401 | 16% | tfidf | upsampl. | char 4 | 0.341 | 28% |
| NB | counts | upsampl. | char 3 | 0.464 | 3% | counts | no sampl. | char 2 | 0.409 | 14% |

TABLE 4-continued

| Best QWK results for CNG, SVM and NB classifiers for set 8. For each task, the best overall result is bold. |
|---|

| "Sentence Fluency": Inter-rater agreement QWK = 0.498 |
|---|

| | rater 1 | | | | rater 2 | | |
|---|---|---|---|---|---|---|---|
| classifier | best parameters | | QWK | diff | best parameters | | QWK | diff |
| CNG | | char 4 | 0.489 | 2% | | char 4 | 0.459$_{\ddagger}$ | 8% |
| SVM | tfidf | upsampl. char 3 | 0.443 | 11% | tfidf | upsampl. word 1 | 0.372 | 25% |
| NB | counts | no sampl. char 3 | 0.455 | 9% | counts | no sampl. char 3 | 0.425$_{\ddagger}$ | 15% |

| "Conventions": Inter-rater agreement QWK = 0.532 |
|---|

| | rater 1 | | | | rater 2 | | |
|---|---|---|---|---|---|---|---|
| classifier | best parameters | | QWK | diff | best parameters | | QWK | diff |
| CNG | | char 4 | 0.454$_{\ddagger}$ | 15% | | char 4 | 0.436$_{\ddagger}$ | 18% |
| SVM | tfidf | no sampl. char 6 | 0.403 | 24% | tfidf | upsampl. char 3 | 0.384 | 28% |
| NB | tfidf | upsampl. char 10 | 0.441$_{\ddagger}$ | 17% | counts | no sampl. char 3 | 0.417 | 22% |

Statistical significance ($p < 0.05$) of differences between QWK and task-specific baselines in annotated by *, †, ‡, denoting results higher than the best (in the task) result of, respectively, CNG, SVM with tfidf and upsampling, NB with counts and upsampling.

We performed statistical significance testing for differences between each result reported in Tables 2, 3, 4, and the best for a given task result of CNG, of SVM with tfidf scores and upsampling, and of NB with counts and upsampling (see annotation of results).

We can observe that the algorithms that achieved the best overall results for a given task were CNG (11 tasks), SVM with tfidf scores and upsampling of training data (10 tasks) and NB with counts (3 tasks). The second observation is that the best results of classifiers often do not differ in a statistically significant way; only on 5 tasks is the SVM result statistically significantly better than CNG, while only on 4 tasks is CNG statistically better than SVM with tfidf scores and upsampling. Finally, we can note that the best performance achieved on particular classification tasks varies substantially when compared to the agreement of the human raters. Set 2 (Table 2) demonstrates the highest agreement between the human raters, and demonstrates the highest discrepancy between the raters and the classifier. On set 8 (Table 4), by contrast, the results of classifiers are relatively close to the inter-raters QWK (especially for rater 1, on three dimensions, the QWK of CNG differs from the inter-rater QWK by less than 5%).

Impact of up Sampling and Weight in g Scores

We compared, for SVM and NB, QWK values with upsampling and without upsampling in each task, for the best results over 13 feature sets. We could observe that upsampling was beneficial when tfidf scores are used (yielding results statistically significantly higher in 19 SVM tasks and 23 NB tasks; and not significantly different in remaining tasks). We also observed that when counts are used, the upsampling effect was in most cases not statistically significant, and not always increasing the performance.

We also performed analysis on which type of scores {counts or tfidf {lead to a better performance for SVM and NB {considering, in each task the best results over n-gram types. SVM with upsampling performed better with t df than counts (results statistically significantly higher in 17 tasks, and not significantly different in remaining tasks). For SVM without upsampling, the performance of the two types of scores was similar (results statistically significantly different only in 8 tasks; in 5 of those 8 tasks t df performed better). NB generally per-formed better using counts rather than t df. That was especially pronounced when upsampling is not employed (results with counts statistically significantly better in 23 tasks, and not significantly different in the remaining task). Without upsampling, the performance of the two types of weights for NB was statistically significantly different only in 4 tasks, but in all of these 4 tasks counts performed better.

TABLE 5

| Six best performing features for selected classifiers. |
|---|

| CNG | | SVM tfidf upsampl. | | NB counts no sampl. | | NB counts upsampl. | |
|---|---|---|---|---|---|---|---|
| feature | "#good" | feature | "#good" | feature | "#good" | feature | "#good" |
| char 4 | 24 | char 4 | 20 | char 3 | 22 | char 3 | 23 |
| char 5 | 23 | char 5 | 18 | char 2 | 19 | char 4 | 19 |
| char 6 | 19 | char 3 | 18 | char 4 | 7 | word 1 | 18 |
| word 1 | 12 | char 6 | 17 | word 1 | 3 | char 2 | 17 |
| char 7 | 11 | word 1 | 13 | stem 1 | 3 | stem 1 | 12 |
| char 8 | 9 | stem 1 | 12 | char 5 | 2 | char 5 | 10 |

Feature Analysis

We performed analysis of features for four selected types of classifiers: CNG, SVM with t df scores and upsampling of training data, and NB with counts and with or without upsampling of training data (that is, for the classifiers that for at least one task yielded the overall best performance).

For a given classifier, we ranked the n-gram types by a number of tasks (out of 24), in which a given type was not statistically significantly worse than the best performing n-gram type in the task {we called this number \#good". In Table 5, we report six best feature sets for each classifiers, and denote as bold the ones for which \#good" is greater or equal to the half of the total number of tasks (among feature sets not included in the table, none has this property).

The analysis indicate that character 4-grams and 5-grams are the best features for CNG and SVM; character 6-grams and word unigrams are also well suited for both these classifiers. Character 3-grams perform well for SVM, and short character n-grams of the length 2, 3 and 4 perform especially well for Na•ve Bayes.

We also analyzed the impact of stemming of words. For three of the selected classifiers: CNG, SVM and NB without upsampling {stemming often de-creased the performance and only in one CNG task \stemmed word" unigrams performed statistically significantly better than word unigrams, and \stemmed word" bigrams never performed statistically significantly better than word bi-grams. While for NB without upsampling, stemming for unigrams often increased the performance, it can be seen (Table 5) that for this classifier neither words nor stemmed words are good features comparing to short character n-grams. Thus in general stop word removal and stemming has been found not useful.

Future Work

We reported on our experiments on automatic prediction of scores in detailed evaluation rubric of essays, based on supervised classification. Promising results were obtained based on character n-grams and word unigram representations, using CNG classifier, SVM with SGD learning with t df scores, and Naive Bayes with raw counts (when compared to the inter-rater agreement between the scores of human raters). CNG algorithm, proposed originally for author identification, performed well compared to the other classifiers.

We analyzed the impact of random upsampling of minority classes as a way of dealing with class (mark) imbalance in the training sets, and showed that especially for SVM with t df scores, it increases the performance. Analysis of suitability of particular types and weighting of n-grams for the problem was also performed.

Several methods of improving the performance of the prediction could be investigated. Natural ones include combining different types of n-grams, either by using them together in document representation, or by an ensemble of classifiers based on different n-grams. Combining n-gram-based features with other types of features, such as for parts of speech, detected spelling/grammar errors, presence of prescribed words, is another natural possibility. Future research could focus on investigating the role CNG and its similarity can play in complementing existing processes in AES tasks.

While the applicant's teachings described herein are in conjunction with various example embodiments for illustrative purposes, it is not intended that the applicant's teachings be limited to such example embodiments. On the contrary, the applicant's teachings described and illustrated herein encompass various alternatives, modifications, and equivalents, without generally departing from the example embodiments described herein.

The invention claimed is:

1. A method for automatically assessing a plurality of users of an electronic learning system, the electronic learning system including a plurality of user computing devices, an instructor computing device, at least one data storage device, and at least one processor, the method comprising:

receiving grade objects for the plurality of users from the instructor computing device, wherein, for an essay, the grade object is obtained by:

training first, second, third, and fourth common n-gram classifiers and storing the first, second, third, and fourth common n-gram classifiers on the at least one data storage device, wherein the second common n-gram classifier using a different type of n-gram than the first common n-gram classifier, the third common n-gram classifier is trained separately from the first and second common n-gram classifiers, and the fourth common n-gram classifier is trained separately from the first and second common n-gram classifiers and uses a different type of n-gram than the third common n-gram classifier;

receiving, at the at least one processor, the essay from the user computing device of a user, the essay sent as a first electronic file and sent to the at least one processor via an electronic communications channel;

pre-processing, using the at least one processor, the essay, including removing stop words and stemming remaining words of the essay and extracting n-grams;

automatically accessing, using the at least one processor, the first common n-gram classifier stored on the at least one storage device and automatically applying, using the at least one processor, the first common n-gram classifier to generate a first score for a style dimension of the essay;

automatically accessing, using the at least one processor, the second common n-gram classifier stored on the at least one storage device and automatically applying, using the at least one processor, the second common n-gram classifier to generate a second score for the style dimension of the essay;

automatically accessing, using the at least one processor, the third common n-gram classifier stored on the at least one storage device and automatically applying, using the at least one processor, the third common n-gram classifier to generate a third score for an organization dimension of the essay;

automatically accessing, using the at least one processor, the fourth common n-gram classifier stored on the at least one storage device and automatically applying, using the at least one processor, the fourth common n-gram classifier to generate a fourth score for the organization dimension of the essay; and generating, using the at least one processor, a grade object for the essay, the grade object including the first, second, third, and fourth scores;

automatically applying one or more contributor policies to the grade objects to generate processed grade objects;

automatically applying an aggregator to the processed grade objects to generate an aggregate grade object;

automatically applying one or more result policies to the aggregate grade object to generate a result grade object for each of the plurality of users;

sending, from the at least one processor, the result grade object to each of the plurality of user computing devices, wherein the result grade object is sent from the at least one processor to the user computing device via the electronic communications channel.

2. The method of claim 1, wherein the method further comprises storing the result grade object in a data storage device of the electronic learning system.

3. The method of claim 1, wherein the method further comprises at least one of displaying the result grade object on a display, and generating a hardcopy output of the result grade object.

4. An electronic learning system including automated marking for a plurality of users, the system comprising:

at least one data storage device, the at least one storage device storing a first common n-gram classifier, a second common n-gram classifier, a third common n-gram classifier, and a fourth common n-gram classifier, the second common n-gram classifier using a different type of n-gram than the first common n-gram classifier, wherein the third common n-gram classifier is trained separately from the first and second common n-gram classifiers, and wherein the fourth common n-gram classifier is trained separately from the first and second common n-gram classifiers and uses a different type of n-gram than the third common n-gram classifier; and at least one processor communicatively coupled to the at least one data storage device, the at least one processor operable to:

receive grade objects for the plurality of users from an instructor computing device, wherein, for an essay, the grade object is obtained by:

receive an essay from a user computing device of each of a plurality of users, the essay sent as a first electronic file and sent to the at least one processor from the user computing device via an electronic communications channel;

pre-process the essay, including removing stop words and stemming remaining words of the essay and extracting n-grams;

automatically access the first common n-gram classifier stored on the at least one data storage device and automatically apply the first common n-gram classifier to generate a first score for a style dimension of the essay;

automatically access the second common n-gram classifier stored on the at least one data storage device and automatically apply the second common n-gram classifier to generate a second score for the style dimension of the essay;

automatically access the third common n-gram classifier stored on the at least one data storage device and automatically apply the third common n-gram classifier to generate a third score for an organization dimension of the essay;

automatically access the fourth common n-gram classifier stored on the at least one data storage device and automatically apply the fourth common n-gram classifier to generate a fourth score for the organization dimension of the essay; and generate a grade object for the essay, the the grade object including the first, second, third, and fourth scores;

automatically applying one or more contributor policies to the grade objects to generate processed grade objects;

automatically applying an aggregator to the processed grade objects to generate an aggregate grade object;

automatically applying one or more result policies to the aggregate grade object to generate a result grade object for each of the plurality of users;

send the result grade object for each of the plurality of users to the user computing device of the user via the electronic communications channel.

5. The automated marking system of claim 4, wherein the at least one processor is further configured to store the result grade object in the data storage device.

6. The automated marking system of claim 4, wherein the at least one processor is further configured to display the result grade object on a display or generate a hardcopy output of the evaluation.

7. A non-transitory computer readable medium comprising a plurality of instructions executable on at least one processor of an electronic device for configuring the electronic device to implement a method for automatically marking a plurality of users, wherein the method comprises:

receiving grade objects for the plurality of users, wherein, for an essay, the grade object is obtained by:

training first, second, third, and fourth common n-gram classifiers and storing the first, second, third, and fourth common n-gram classifiers on at least one data storage device, wherein the second common n-gram classifier using a different type of n-gram than the first common n-gram classifier, the third common n-gram classifier is trained separately from the first and second common n-gram classifiers, and the fourth common n-gram classifier is trained separately from the first and second common n-gram classifiers and uses a different type of n-gram than the third common n-gram classifier;

receiving, at the at least one processor, the essay from at least one of the plurality of users, the essay sent to the at least one processor via an electronic communications channel;

pre-processing the essay, including removing stop words and stemming remaining words of the essay and extracting n-grams;

automatically accessing the first common n-gram classifier stored on the at least one data storage device and automatically applying the first common n-gram classifier to generate a first score for a style dimension of the essay;

automatically accessing the second common n-gram classifier stored on the at least one data storage device and automatically applying the second common n-gram classifier to generate a second score for the style dimension of the essay;

automatically accessing the third common n-gram classifier stored on the at least one data storage device and automatically applying the third common n-gram classifier to generate a third score for an organization dimension of the essay;

automatically accessing the fourth common n-gram classifier stored on the at least one data storage device and automatically applying the fourth common n-gram classifier to generate a fourth score for the organization dimension of the essay; and generating a grade object for the essay, the the grade object including the first, second, third, and fourth scores;

automatically applying one or more contributor policies to the grade objects to generate processed grade objects;

automatically applying an aggregator to the processed grade objects to generate an aggregate grade object;

automatically applying one or more result policies to the aggregate grade object to generate a result grade object for each of the plurality of users;

sending the result grade object to each of the plurality of users via an electronic communications channel.

8. The method of claim 1, wherein grade objects are numerical.

9. The method of claim 1, wherein the grade objects are aggregated across a plurality of subjects.

10. The method of claim 1, wherein one or more of the grade objects are pre-emptive grade objects to forecast a result grade object.

* * * * *